(12) United States Patent
Kannermark et al.

(10) Patent No.: US 8,982,228 B2
(45) Date of Patent: Mar. 17, 2015

(54) DEVICE AND A METHOD FOR IMAGE ACQUISITION

(71) Applicant: AXIS AB, Lund (SE)

(72) Inventors: Per Kannermark, Malmo (SE); Anders Johannesson, Hollviken (SE)

(73) Assignee: AXIS AB, Lund (SE)

( * ) Notice: Subject to any disclaimer, the term of this patent is extended or adjusted under 35 U.S.C. 154(b) by 55 days.

(21) Appl. No.: 14/038,360

(22) Filed: Sep. 26, 2013

(65) Prior Publication Data

US 2014/0092277 A1 Apr. 3, 2014

Related U.S. Application Data

(60) Provisional application No. 61/709,218, filed on Oct. 3, 2012.

(30) Foreign Application Priority Data

Oct. 1, 2012 (EP) ..................................... 12186848

(51) Int. Cl.
*H04N 5/235* (2006.01)
*H04N 5/353* (2011.01)
*H04N 5/376* (2011.01)

(52) U.S. Cl.
CPC ........... *H04N 5/2357* (2013.01); *H04N 5/3532* (2013.01); *H04N 5/376* (2013.01)
USPC ..................................... 348/221.1; 348/226.1

(58) Field of Classification Search
USPC ..................................... 348/221.1, 226.1, 362
See application file for complete search history.

(56) References Cited

U.S. PATENT DOCUMENTS

| 8,218,029 B2 | 7/2012 | Nagai |
| 2001/0005225 A1 | 6/2001 | Clark et al. |
| 2007/0076012 A1 | 4/2007 | Cernasov et al. |
| 2008/0278603 A1 | 11/2008 | Lee et al. |
| 2011/0205411 A1 | 8/2011 | Voronov |

*Primary Examiner* — Gevell Selby
(74) *Attorney, Agent, or Firm* — Volpe and Koenig, P.C.

(57) ABSTRACT

An image acquisition device and a method for capturing image data is disclosed. The method comprises exposing an image sensor to light from a scene, selecting substantially all rows of sensor pixels in an image sensor in a substantially random order, starting an exposure period for each row of sensor pixels in the image sensor in the order the rows were selected, buffering the rows of sensor pixels comprised in an image frame until all rows of the image frame have registered image data for the presently captured image frame, and outputting image data representing the image frame by outputting image data from each row of sensor pixels.

20 Claims, 5 Drawing Sheets

DEVICE AND A METHOD FOR IMAGE ACQUISITION

INCORPORATION BY REFERENCE

This application claims the benefit of U.S. provisional application No. 61/709,218 filed Oct. 3, 2012 and European Patent Application No. 12186848.3 filed Oct. 1, 2012, which are incorporated by reference as if fully set forth.

FIELD OF INVENTION

The present invention relates to an image acquisition device including an image sensor and a timing generator. Additionally the present invention relates to a method for capturing image data by means of an image sensor.

BACKGROUND

Image acquisition devices having image sensors and implementing an electronic shutter is commonly used, in particular when it comes to capturing motion images, i.e. video sequences. Many of these image acquisition devices also implements a rolling shutter, i.e. the exposure timing for the image sensor varies from row to row in the image sensor. Imagery from these cameras includes a stripe pattern, sometimes only one stripe, in the direction of the rows, which most of the time moves over the motion image. The stripe pattern is an annoying effect and may even be critical in monitoring or surveillance applications as this distinct pattern may make a person watching the motion image lose focus due to its invasive nature. The stripe pattern effect is called flicker and is attributed to the blinking period of light sources lighting the scene captured, e.g. fluorescent lamps, LED lighting, etc., the use of electronic shutter in the image acquisition device.

The problem of flicker in captured images is addressed in U.S. Pat. No. 8,218,029. In this patent, the flicker is removed by means of first generate a reference video signal containing no flicker. Then, the reference video signal is compared with a video signal containing the flicker. Subsequently, based on the comparison, a flicker component showing the characteristic of the flicker contained in the image taking video signal is found. From the flicker component, the characteristic of the flickers contained in the image taking video signal can be recognized and the flickers contained in the image taking video signal can thus be removed (or reduced).

SUMMARY

One object of the present invention is to provide an alternative way of reducing the effects of flicker to the user or to systems using the imagery.

In particular, according to one embodiment of the present invention, an image acquisition device comprises an image sensor including a plurality of rows of sensor pixels, a timing generator generating timing signals for the image sensor. Further, the image acquisition device includes a random value source, and the timing generator is connected to the random value source, is arranged to select a row of the image sensor based on the random value signal, and is arranged to generate a start exposure signal to the selected row.

The advantage of randomizing the exposure timing of the rows of the image sensor is that the distinct flicker striping is spread out over the image surface at random rows and will therefore be perceived both by a viewer and by analyzing algorithms as noise. Hence, the experience of viewing the imagery captured is enhanced and analysis of imagery may be simplified because they do not need to consider a striping pattern moving over a motion video.

According to one embodiment, the random value source includes a pseudo random code. Thereby it is possible to utilize the random nature spreading the striping pattern but still retain predictability.

According to another embodiment, the random value source includes a random number generator.

In one embodiment, the image acquisition device further comprises an image frame composer connected to an image data output of the image sensor, the image frame composer is arranged to compose an image frame from rows of image data outputted in a substantially random order from the image sensor and has access to the order in which the rows of image data was is outputted from the image sensor. The advantage of the image frame composer is that the image frame will be compatible with existing image processing devices and processes in that the randomized image row acquisition is reordered to a normal sequential image structure but still void of the or having less pronounced flickering effect.

In another embodiment, the image frame composer is connected to the random value source, which is connected to the timing generator.

According to yet another embodiment, an exposure time period for each row of the plurality of rows in an image frame is predetermined.

Further, according to another aspect of the invention, a method for capturing image data comprises exposing an image sensor to light from a scene, selecting substantially all rows of sensor pixels in an image sensor in a substantially random order, starting an exposure period for each row of sensor pixels in the image sensor in the order the rows were selected, and outputting image data representing an image frame by outputting image data from each row of sensor pixels. The advantage of randomizing the exposure timing of the staring of the exposure of the rows in the image sensor is that the distinct flicker striping is spread out over the image surface at random rows and will therefore be perceived both by a viewer and by analyzing processes as noise. Hence, the experience of viewing the imagery captured is enhanced and analysis of imagery may be simplified because they do not need to consider a striping pattern being stationary in or moving over a motion video.

In one embodiment, the outputting of image data from each row of sensor pixels from the image sensor is performed row by row in an order corresponding to the order in which the exposure periods ends for the individual rows, and further comprising generating a digital image representing an image frame from the rows of image data, wherein the generation of the digital image includes arranging each row of image data at a position within the digital image that corresponds to the position in the image sensor from which the row of image data was outputted. The advantage of this process is that the resulting image frame will be compatible with existing image processing devices and processes in that the randomized image row acquisition is reordered to a normal sequential image structure but still void of the or having less pronounced flickering effect.

In another embodiment, the method further comprises buffering the rows of sensor pixels comprised in an image frame until all rows of the image frame have registered image data for the presently captured image frame, wherein the outputting of image data is performed by outputting the rows of sensor pixels from the image sensor in sequence from one edge of the image sensor to the opposite edge of the image sensor. The advantage of this process is also that the resulting image frame will be compatible with existing image processing devices and processes in that the randomized image row acquisition is reordered to a normal sequential image structure but still void of the or having less pronounced flickering effect.

According to one embodiment, the method further comprises reading from a memory a sequence of substantially random values and wherein the order in which the plurality of rows is selected is based on this sequence of substantially random values.

According to another embodiment, the method further comprises receiving a sequence of substantially random values and wherein the order in which the plurality of rows is selected is based on this sequence of substantially random values.

According to yet another embodiment, the method further comprises generating a sequence of substantially random values and wherein the order in which the plurality of rows is selected is based on this sequence of substantially random values.

In one embodiment, the sequence of substantially random values includes pseudo random values.

According to another embodiment, the method further comprises frequently repeating the acts of selecting rows in a substantial random order, starting an exposure period for each row in the order the rows where selected, and outputting image data representing an image frame.

According to yet another embodiment, the method further comprises frequently repeating the acts of selecting rows in a substantial random order, starting an exposure period for each row in the order the rows where selected, outputting image data representing an image frame, and generating a digital image from the plurality of rows of image data related for each image frame that is outputted.

According to one embodiment, the acts of selecting rows in a substantial random order, starting an exposure period for each row in the order the rows where selected, and outputting image data representing an image frame, are repeated at least ten times per second.

According to one embodiment, the acts of frequently repeating the acts of selecting rows in a substantial random order, starting an exposure period for each row in the order the rows where selected, outputting image data representing an image frame, and generating a digital image from the plurality of rows of image data related for each image frame that is outputted, are repeated at least ten times per second.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the Figures like reference characters designate like or corresponding parts throughout the several Figures.

DETAILED DESCRIPTION

A digital image acquisition device, such as a still camera, a video camera, an IR-camera, etc., has a housing enclosing an image sensor, an optical system, e.g. a lens, for projecting light from a scene to capture onto the image sensor, electronics for generating digital images from the light captured by the image sensor, and electronics for controlling other aspects of the image acquisition device, e.g. communications, user interface, etc.

Figure 1A:
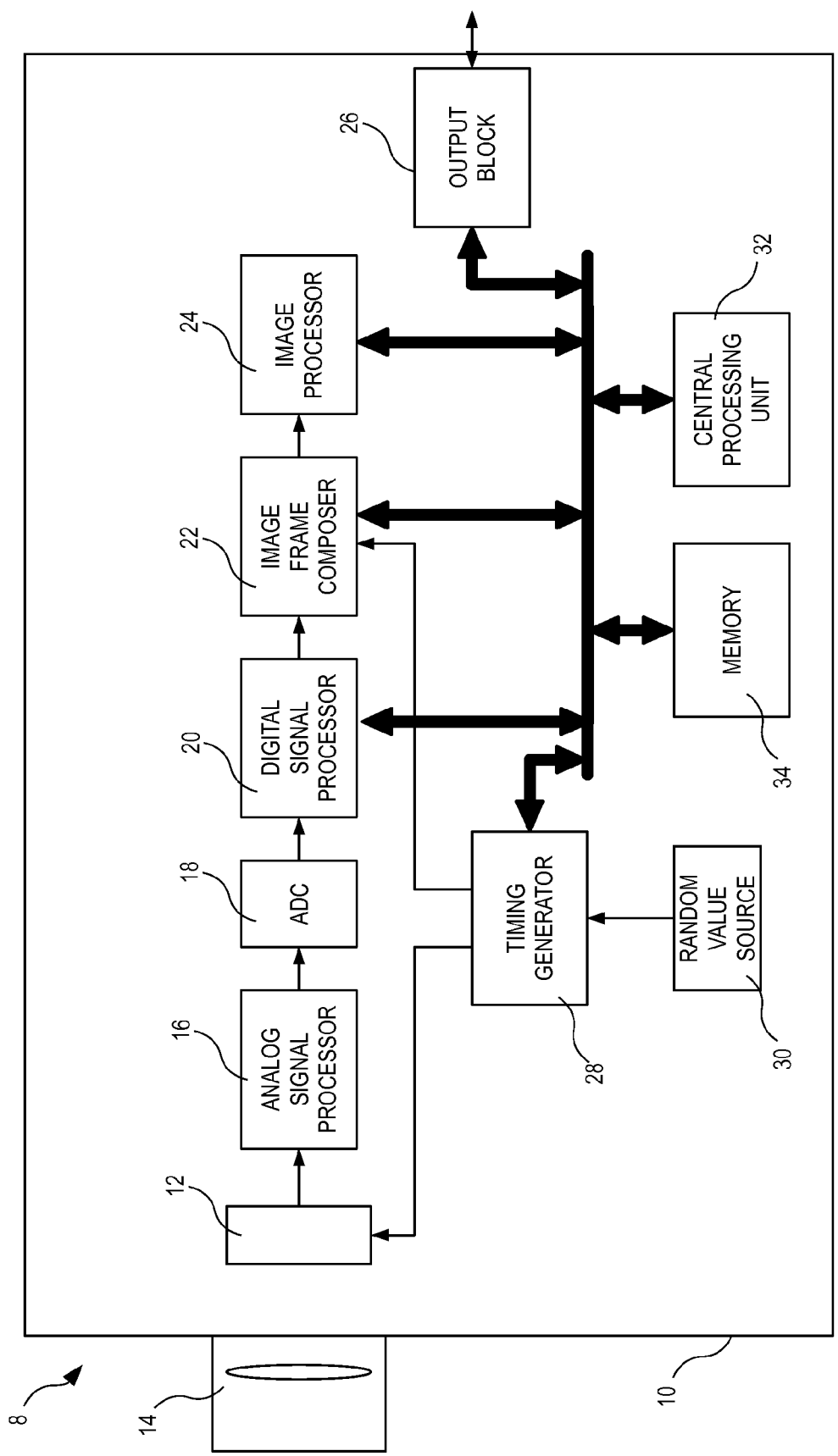
FIG. 1a is a schematic block diagram over one embodiment of the invention.

An image acquisition device 8, according to one embodiment of the invention, is shown in FIG. 1a. The image acquisition device 8 includes a housing 10, an image sensor 12, a lens 14, an analog signal processor 16, an analog to digital converter 18 (A/D-converter), a digital signal processor 20, an image frame composer 22, an image processor 24 and an output block 26. The analog signal processor 16 is optional and is not necessary for implementing the invention. The digital signal processor 20 is also optional and accordingly not necessary for implementing the invention. The image acquisition device 8 further comprises a timing generator 28, a random value source 30, a central processing unit 32, and a memory 34.

The lens 14 of the image acquisition device 8 receives light from the scene to be captured by the image acquisition device 8. The lens 14 focuses the light onto an image sensor 12 in order to capture and register the light representing the scene. The image sensor 12 may be any known image sensor implementing rolling shutter, e.g. a Complementary Metal-Oxide-Semiconductor (CMOS) sensor.

The image sensor 12 includes an image output arranged to output signals indicating the registered light from the scene. The output of this image data is, according to one embodiment of the invention, controlled by at least one timing signal from the timing generator (i.e., what and when to output is controlled by signaling from the timing generator 28). The timing generator 28 instructs the image sensor 12 to output one row at a time and it addresses specific image rows to be outputted. This may be performed by the timing generator 28 sending reset and readout signals addressing the individual rows in sequence, e.g. electronic rolling shutter. However, in the present invention the timing generator 28 makes use of a sequence of random values provided by the random value source 30. The timing generator 28 then selects which row of the image sensor that are to make the next readout based on the random value provided by the random value source 30.

The random value source 30 may be any kind of source from which substantially random values may be received. The random value source 30 may for example be a random number generator, a pseudo random number generator, a predetermined sequence of random or pseudo random values stored in a memory, etc. In the context of the present application, the term sequence of random values is to be understood as a sequence of values that do not show any pattern and the term sequence of pseudo random values is to be understood as a sequence of values that follows a predetermined pattern but that make the sequence appear as random. Hereinafter, the word "random" will be used both for random and pseudo random. The timing generator 28 is arranged to randomly select a row of image data to read out from the image sensor based on the random values.

Then the read out rows of image data may, optionally, be processed by an analog image processor 16. Operations of analog image processors are well known to the skilled person and therefore a description thereof is omitted. The analog to digital converter 18 (ADC) is arranged to convert the analog representation of an image row to a digital format. The operation of the ADC 18 may be performed in any way known to the skilled person.

The digital signal processor 20, optional, may be arranged to perform digital processing of the digital image data. Operations of digital signal processors are well known to persons skilled in the art. The image frame composer 22 is connected to the digital output of the ADC 18, via the digital signal processor 20, if implemented.

The image frame composer 22 operates on the rows of a specific frame by arranging the rows in the correct order to correctly represent the scene from which an image frame is captured. In order to facilitate the reordering of the rows that was randomly selected and outputted from the image sensor 12 the image frame composer 22 is connected to the timing generator 28 in order to access the timing signal sequence used in the readout of the rows of the image frame. The image frame composer 22 may be implemented in hardware by means of logic gates, by means of an FPGA, as software stored in memory 34 and executed in the CPU 32, etc.

The image processor 24 may be arranged to process the full image frame. Examples of processes in the image processor may be Bayer Interpolation, color space conversion, etc.

The output block 26 includes means for making the acquired images accessible from outside the image acquiring device 8. Depending on how the image data is to be consumed or used the output block 26 may include display drivers, interfaces, and electronics required for outputting the acquired images to a display, the output block 26 may include a protocol stack and interface electronics for enabling communication of the image data over a computer network, or the output block 26 may include a bus protocol and interface for direct uploading of the image data to an external storage device.

The memory 34 may be a volatile memory, e.g. any type of RAM, a non-volatile memory, e.g. a PROM, an EPROM, an EEPROM, a Flash memory, etc., or the memory could include both a volatile and a non-volatile memory. The memory 34 may store code to be executed by the central processing unit 32 or by any other processing unit, it may store the sequence of random values and act as the random value source 30, it may temporarily store image data when rows or a frame is processed, etc.

The central processing unit 32 is arranged to control the general functionality of the image acquisition device 8, but may also be used in implementing functions relating to any one of or any combination of the digital signal processor 20, the image frame composer 22, the image processor 24, the timing generator 28, and the output block 26.

Figure 1B:
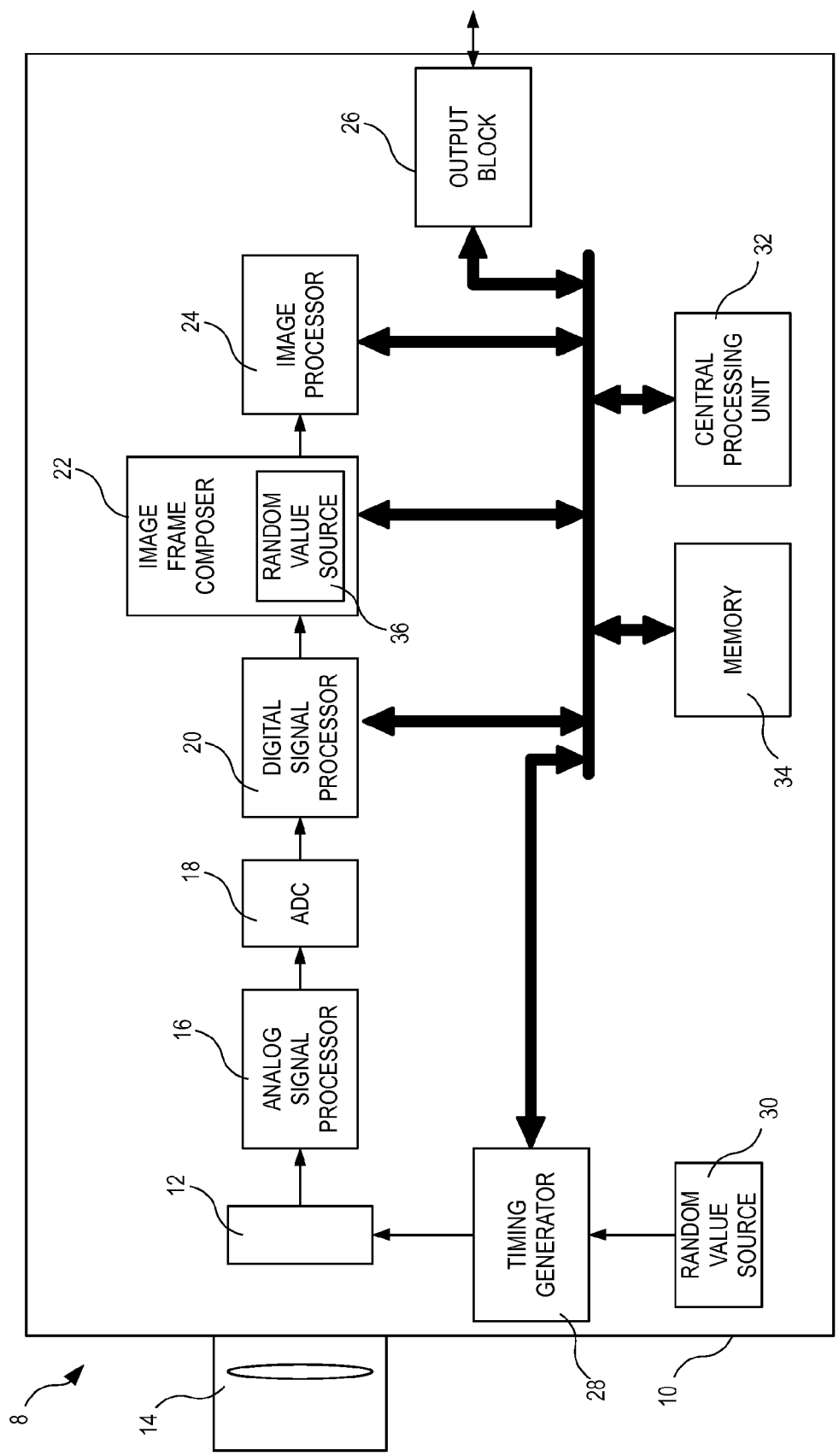
FIG. 1b is a schematic block diagram over another embodiment of the invention.

In an alternative embodiment, see FIG. 1b, the random value source 30 connected to the timing generator 28 is not connected to the image frame composer 22. Instead the image frame composer 22 includes a random value source 36 of its own. The random value source 36 of the image frame composer 22 may be a copy of a predetermined random sequence corresponding to such a random sequence in the random value source 30 or it 36 may be a pseudo random generating function that is synchronized with an identical function in the random value source 30.

Figure 2:
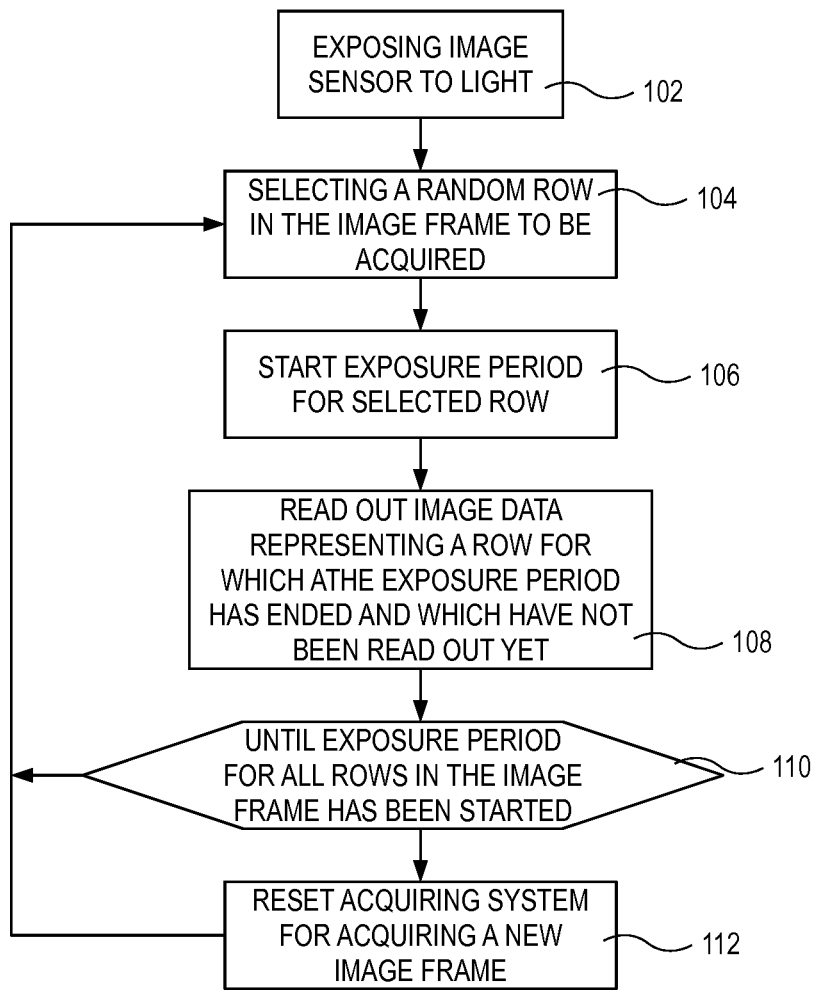
FIG. 2 is a flowchart of an image acquiring process according to one embodiment of the invention.

FIG. 2 shows a flowchart depicting one embodiment of a method for capturing image data. Initially the image sensor 12 is exposed to light from the scene, step 102. The image sensor 12 is exposed to light continuously, e.g. the system is implementing an electronic shutter. A specific row in the image sensor is selected based on a random value, step 104. The selected row should not be a row previously selected during the capturing of the image frame presently being captured. The rows in an image frame presently being captured that have started their exposure period may be registered in a selection list for reference when avoiding selecting the same row twice during the capturing of an image frame. The selected row receives a reset signal, which empties the pixels of the row from charges and thereby initiates the exposure period, step 106. The process continues by reading out image data from a row of the image sensor 12. The data is read out if the exposure period has ended for that particular row, if the exposure period has been started for the capture of this row in the image frame presently being captured, and if the image data of the row has not yet been read out for this image frame, step 108. The process of randomly selecting not yet exposed rows of the image sensor 12, initiating an exposure period, and reading out image data from a row that has been properly exposed is repeated for all rows in the image sensor, step 110. When the exposure period has been started for all rows being part of an image frame then the image frame capturing is reset in order to enable capturing image data belonging to the next image frame, step 112. The resetting of image frame capturing in step 112 may include resetting the selection list. Then the process returns to step 104 for capturing the next image frame in a sequence of image frames.

By exposing the rows of the image sensor 12 that are to form an image frame in a random order (e.g., as described in the embodiment above or in the embodiments to follow), flickering stripes that otherwise would have occurred within a motion video is randomly spread out and appears more like noise. The reason for this is that the flickering is an effect of periodical light sources, e.g. fluorescent lamps or other light sources where the periodicity of the light may be captured as flicker in the motion video. Thus, the disclosed technique utilizes the fact that a random noise is easier for a person to ignore, or not even recognize, than a periodic exposure variation generating the striping effect in the video.

In Table 1 below, an example of exposure timing and output from an image sensor implementing a rolling shutter function for the exposure of images is shown. In order to facilitate the understanding of the invention an 8 row image sensor is discussed, but the skilled person appreciate that an image sensor may include many more rows, e.g. 400 rows, 720 rows, 1080 rows, or any other number of rows.

As seen from the table, the rows are exposed in sequence from the first to the last row, e.g. from a row at one edge of the image sensor to the row at the other edge. The exposure period may overlap the starting of other exposures (in the table three are overlapped). However, exposures may also be completed before the next exposure starts. In the above example the ending of the exposure period and the output of the row coincide. This may not be true for all applications. Moreover, the ending of exposure and the output of exposure may occur at points in time between the starting of exposures of two consecutive rows. However, in order to make the image more comprehensible, these times have been depicted as happening at the same point in time.

TABLE 1

| Time | Start exposure of ROW# | End exposure of ROW# | Output ROW# |
|---|---|---|---|
| t + 1 | 1 | | |
| t + 2 | 2 | | |
| t + 3 | 3 | | |
| t + 4 | 4 | 1 | 1 |
| t + 5 | 5 | 2 | 2 |
| t + 6 | 6 | 3 | 3 |
| t + 7 | 7 | 4 | 4 |
| t + 8 | 8 | 5 | 5 |
| t + 9 | | 6 | 6 |
| t + 10 | | 7 | 7 |
| t + 11 | | 8 | 8 |

Now, in Table 2 below, is presented an example of exposure timing and output from an image sensor implementing a process corresponding to the process described in FIG. 2.

TABLE 2

| Time | Start exposure of ROW# | End exposure of ROW# | Output ROW# |
|---|---|---|---|
| t + 1 | 6 | | |
| t + 2 | 3 | | |
| t + 3 | 5 | | |
| t + 4 | 8 | 6 | 6 |
| t + 5 | 7 | 3 | 3 |
| t + 6 | 1 | 5 | 5 |
| t + 7 | 4 | 8 | 8 |
| t + 8 | 2 | 7 | 7 |
| t + 9 | | 1 | 1 |
| t + 10 | | 4 | 4 |
| t + 11 | | 2 | 2 |

The sequence of random values from the random value source 30 results in a selection of the rows of the image sensor in the following order, 6, 3, 5, 8, 7, 1, 4, and 2.

The process described in relation to FIG. 2 generates a sequence of image rows that are scrambled in respect of row position, i.e. the order of the rows of image data outputted from the image sensor 12 is not such that arranging the rows next to each other in the outputted order would result in an image frame representing the image view captured.

Figure 3:
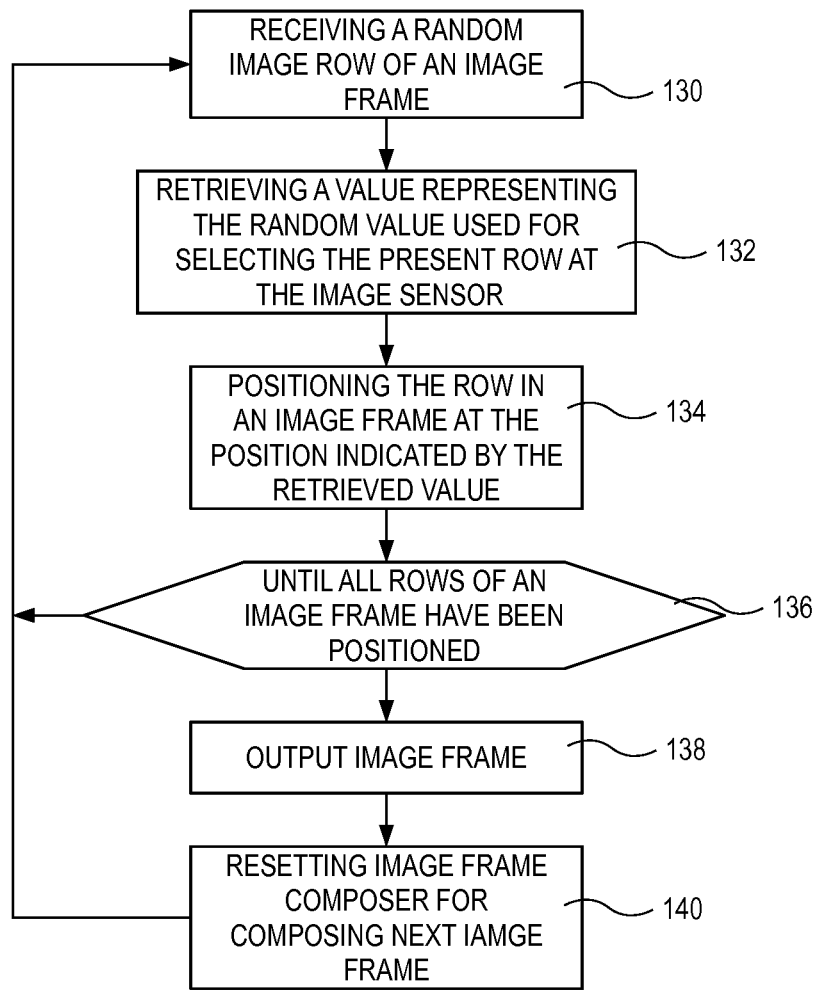
FIG. 3 is a flowchart of a process for an image frame composer according to one embodiment of the invention.

According to one embodiment of the invention, an image composing process, see FIG. 3, is implemented in order to produce an image frame having the rows arranged in an order that allows for presentation of the image frame as a non-scrambled image, i.e. positioning the rows of the image frame at the positions corresponding to the position they represented when captured at the image sensor. The image composing process receives a random row of an image frame outputted from the image sensor, step 130, and retrieves a value or indicator representing the random value used for selecting the received image row at the image sensor, step 132. Thereby, the process is able to calculate the original position of the image row within the image sensor.

The image row is then positioned in the presently processed image frame at the position indicated by the retrieved value, step 134. The steps 130, 132, 134, of receiving a random image row of the presently processed image frame, retrieving a value representing the position of the image row in the image sensor, and positioning the image row in the presently processed image frame is repeated until all image rows of the presently processed image frame are correctly positioned, step 136. When all image rows of the presently processed image frame are positioned, the image frame is correctly composed and is outputted.

The correctly composed image frame may then be processed using normal image processing tools and algorithms and may be processed for viewing or to be stored. Now that the image frame has been composed, it is time to compose the next image frame outputted from the image sensor. Therefore, the image composer is reset in order to enable processing of a new image frame, step 140. The resetting of the image composer may include clearing a list or register keeping track of which image rows in the image frame that have been processed.

Figure 4:
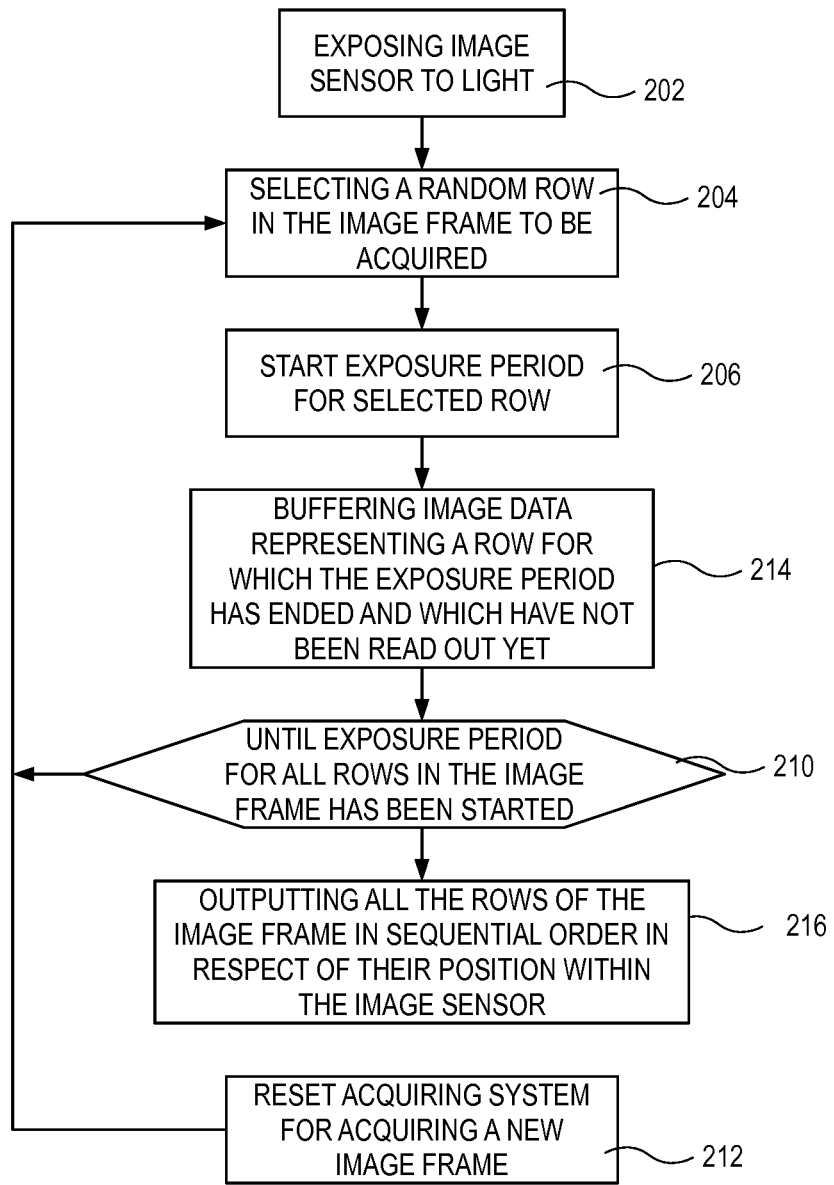
FIG. 4 is a flowchart of an image acquiring process according to another embodiment of the invention.

FIG. 4 shows a flowchart depicting an alternative embodiment of a method for capturing image data. Initially, the image sensor 12 is exposed to light from the scene, step 202. The image sensor 12 is exposed to light continuously, e.g. the system is implementing an electronic shutter. A specific row in the image sensor 12 is selected based on a random value, step 204. The selected row should not be a row previously selected during the capturing of the image frame presently being captured. The rows in an image frame presently being captured that have started their exposure period may be registered in a selection list for reference when avoiding selecting the same row twice during the capturing of an image frame. The selected row receives a reset signal, which empties the pixels of the row from charges and thereby initiates the exposure period, step 206.

The process continues to buffer image data from a row of the image sensor if the exposure period has ended for that row, under the conditions that the row has not already been read out and that the exposure period for the image row has been started, step 214. The rows may be arranged in the buffer in an order corresponding to the order of the position of the image rows within the image sensor or each buffered row may be tagged with a position indicator indicating the position of the image row within the image sensor.

The process of randomly selecting not yet exposed rows of the image sensor, initiating an exposure period, and buffering image data from a row that has been properly exposed is repeated for all rows in the image sensor, step 210. When the exposure period has been started for all rows being part of an image frame, then the image rows of the captured image frame are outputted from the buffer in sequential order in respect of position in the image sensor, step 216, i.e. the image rows are outputted in an order corresponding to the order of the positions of the image rows within the image sensor. Moreover, the image frame capturing is reset in order to enable capturing image data belonging to the next image frame, step 212. The resetting of image frame capturing in step 212 may include resetting the selection list. Then the process returns to step 204 for capturing the next image frame in a sequence of image frames.

According to one embodiment of the invention, the image rows outputted from the image sensor are tagged with a value indicating the row in the image sensor from which it originates. Such a tag could be sent on a separate data channel or be embedded in the image data stream from the image sensor.

According to another embodiment, image frames that have been randomly exposed as discussed above may be further processed by means of noise reducing or noise removing processes. Thereby, the quality of the motion video may be significantly improved in a simple way and at low cost in view of processing capacity and/or hardware resources.

Moreover, the invention may be used for still images but may advantageously be used in motion video. Motion video is for the purpose of this description a frame rate of at least 10 frames per second. However, in a PAL system a motion video has a frame rate of at least 25 frames per second and in a NTSC system the motion video has a frame rate of at least 30 frames per second. The skilled person would appreciate that even higher frame rates are possible and in some applications desirable.

What is claimed is:

1. A method for reducing flicker in captured image data, the method comprising:
    exposing an image sensor to light from a scene;
    selecting substantially all rows of sensor pixels in an image sensor in a substantially random order;
    starting an exposure period for each row of sensor pixels in the image sensor in the order the rows were selected;
    buffering the rows of sensor pixels comprised in an image frame until all rows of the image frame have registered image data for the presently captured image frame; and
    outputting image data representing the image frame by outputting image data from each row of sensor pixels.

2. Method according to claim 1, wherein the outputting of image data from each row of sensor pixels from the image sensor is performed row by row in an order corresponding to the order in which the exposure periods ends for the individual rows, and further comprising generating a digital image representing an image frame from the rows of image data, wherein the generation of the digital image includes arranging each row of image data at a position within the digital image that corresponds to the position in the image sensor from which the row of image data was outputted.

3. Method according to claim 1, wherein the outputting of image data is performed by outputting the rows of sensor pixels from the image sensor in sequence from one edge of the image sensor to the opposite edge of the image sensor.

4. Method according to claim 1, further comprising reading from a memory a sequence of substantially random values and wherein the order in which the plurality of rows is selected is based on this sequence of substantially random values.

5. Method according to claim 1, further comprising receiving a sequence of substantially random values and wherein the order in which the plurality of rows is selected is based on this sequence of substantially random values.

6. Method according to claim 1, further comprising generating a sequence of substantially random values and wherein the order in which the plurality of rows is selected is based on this sequence of substantially random values.

7. Method according to claim 4, wherein the sequence of substantially random values includes pseudo random values.

8. Method according to claim 5, wherein the sequence of substantially random values includes pseudo random values.

9. Method according to claim 6, wherein the sequence of substantially random values includes pseudo random values.

10. Method according to claim 1, further comprising frequently repeating the steps of selecting rows in a substantial random order, starting an exposure period for each row in the order the rows where selected, and outputting image data representing an image frame.

11. Method according to claim 2, further comprising frequently repeating the steps of selecting rows in a substantial random order, starting an exposure period for each row in the order the rows where selected, outputting image data representing an image frame, and generating a digital image from the plurality of rows of image data related for each image frame that is outputted.

12. Method according to claim 4, further comprising frequently repeating the steps of selecting rows in a substantial random order, starting an exposure period for each row in the order the rows where selected, outputting image data representing an image frame, and generating a digital image from the plurality of rows of image data related for each image frame that is outputted.

13. Method according to claim 5, further comprising frequently repeating the steps of selecting rows in a substantial random order, starting an exposure period for each row in the order the rows where selected, outputting image data representing an image frame, and generating a digital image from the plurality of rows of image data related for each image frame that is outputted.

14. Method according to claim 6, further comprising frequently repeating the steps of selecting rows in a substantial random order, starting an exposure period for each row in the order the rows where selected, outputting image data representing an image frame, and generating a digital image from the plurality of rows of image data related for each image frame that is outputted.

15. Method according to claim 7, further comprising frequently repeating the steps of selecting rows in a substantial random order, starting an exposure period for each row in the order the rows where selected, outputting image data representing an image frame, and generating a digital image from the plurality of rows of image data related for each image frame that is outputted.

16. An image acquisition device arranged to reduce flicker in acquired images comprising:
    an image sensor including a plurality of rows of sensor pixels;
    a timing generator generating timing signals for the image sensor;
    a random value source;
    wherein the timing generator is connected to the random value source, is arranged to select a row of the image sensor based on the random value signal, and is arranged to generate a start exposure signal to the selected row;
    a memory for buffering image data pertaining to rows of sensor pixels being exposed; and
    an image frame composer connected to the memory, the image frame composer is arranged to compose an image frame from the image data pertaining to rows of the sensor pixels buffered in the memory in a substantially random order, and has access to the order in which the rows of image data was buffered in the memory.

17. Image acquisition device according to claim 16, wherein the random value source includes a pseudo random code.

18. Image acquisition device according to claim 16, wherein the random value source includes a random number generator.

19. Image acquisition device according to claim 16, wherein the image frame composer is connected to the random value source, which is connected to the timing generator.

20. Image acquisition device according to claim 16, wherein an exposure time period for each row of the plurality of rows in an image frame is predetermined.

* * * * *